April 13, 1937.  A. S. LEWIS  2,077,118
METHOD OF SHAPING
Filed Oct. 14, 1935
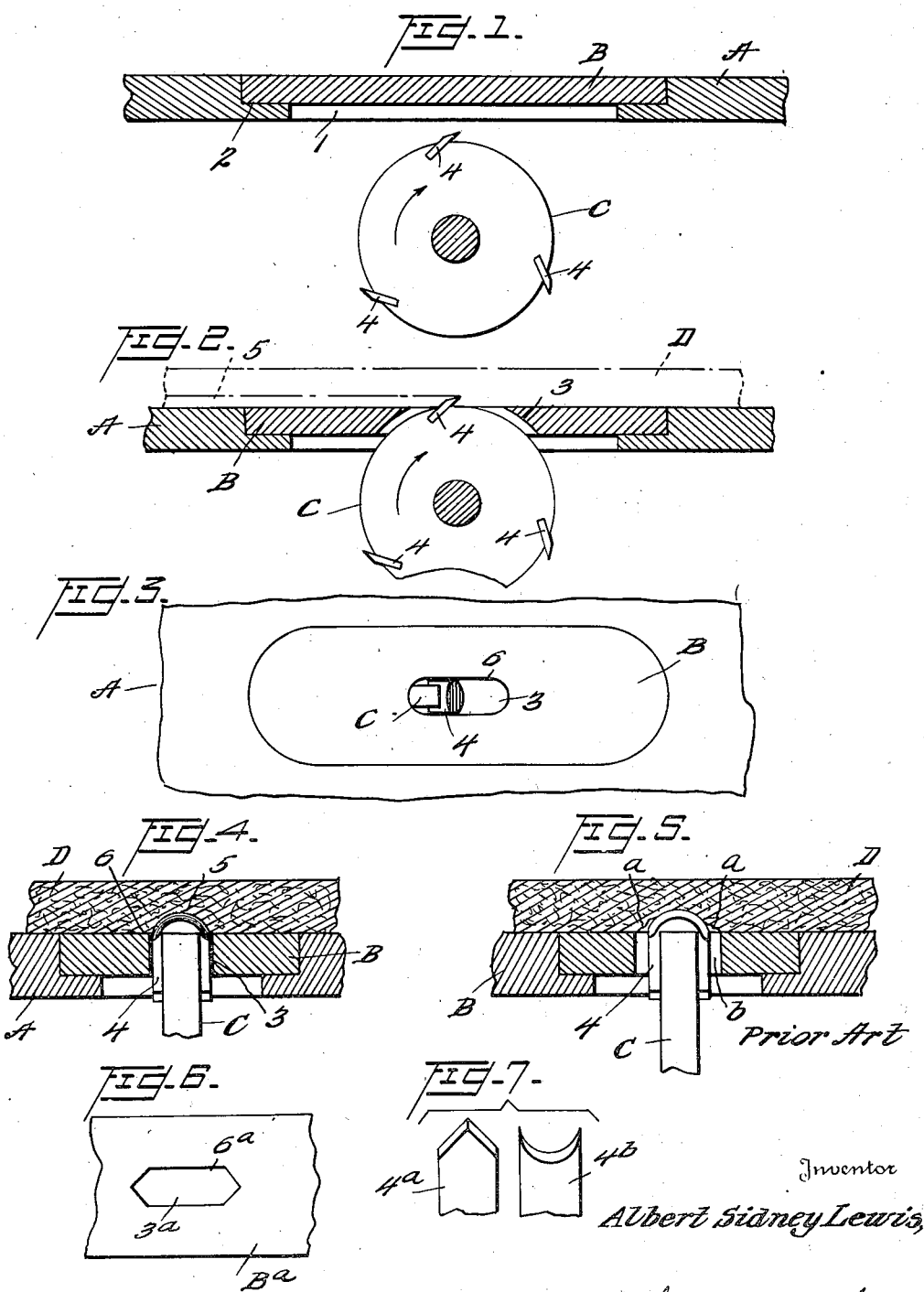
Inventor
Albert Sidney Lewis,
By Shreve, Crowe & Gordon
Attorney Patented Apr. 13, 1937

2,077,118

UNITED STATES PATENT OFFICE 2,077,118

METHOD OF SHAPING

Albert Sidney Lewis, Atlanta, Ga.

Application October 14, 1935, Serial No. 44,942

3 Claims. (Cl. 144—309)

Generically this invention relates to saw or cutter tables, but it more especially comprehends the cutter insert therefor and method of producing same in accordance with the particular type of cutter required for each design or cut to be made in fiber board and the like.

One of the principal objects of this invention is the provision of a cutter insert for each design to be cut in fiber board, the dimensions of the opening formed in the insert being governed by the depth of the particular cut or design, and the perimeter of said opening constituting a supporting edge fitting closely the edges of the cutting element or blades to prevent ravelling or spalling of the edges of the fiber board surrounding the cut or intaglio design as the latter is being formed.

An important object of this invention is the provision of a cutter insert for the table of rotary sawing, cutting and routing machines for effecting cuts or intaglio designs, more especially in fiber board made from compressed vegetable or mineral fibers, each of said inserts being formed in blank, inserted in the machine table and then having the cutter initially operate to form the opening therein, so that the edge of the perimeter of said opening will conform exactly to the contour of said rotary cutter and constitute a supporting edge closely fitting said cutter, the dimension of the opening being controlled by the depth of the design or cut to be made, the continued operation of said cutter then effecting the predetermined cut or intaglio design without tearing away, ravelling or spalling the edges of the design.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a fragmentary side elevation of a rotary cutter and movable table in inoperative position showing the blank insert in position.

Fig. 2 is a similar view of the table in operative work supporting position showing the cutter extending through the opening formed by it in the insert and in process of cutting the design.

Fig. 3 is a fragmentary top plan view of Fig. 2 with the work removed.

Fig. 4 is a cross section view of Fig. 2.

Fig. 5 is a similar view to Fig. 4 showing the prior art.

Fig. 6 is a fragmentary top plan view of a modified form of insert.

Fig. 7 is a fragmentary detailed view of different types of cutter blades.

Fiber boards are made from compressed vegetable or mineral fibers and are customarily used in the building industry for purposes of decoration, sound absorption, insulation, and the like, and owing to the fact that such boards have short fibers, no grain, and the material being of comparatively low density, it has heretofore been impossible to cut intaglio designs in them by the use of the ordinary cutter insert without the edges of the cut or designs becoming torn away, ravelled or spalled during the cutting process, and, therefore, it was to overcome the deficiencies of the cutter inserts and results of the machines heretofore in use, by utilizing each cutter adapted to form a particular design intaglio in a fiber board, to first form the opening in a blank insert constituting a portion of the work supporting table of the machine, so that the edge of the perimeter of the opening would constitute a work supporting edge closely fitting said cutter, the size of the opening depending upon the depth of the design to be cut, and then to successively cut the design in the board supported on said table and insert when moved into engagement therewith, that I designed the insert and method of making same forming the subject matter of this invention.

In the illustrated embodiment characterizing this invention there is shown a sawing or cutting machine work supporting table A, a cutter insert B constituting a section of said table, a rotary cutter element C, and the work being operated on D.

The table A is formed with a cut out portion 1 and surrounding said portion is a countersunk portion 2 adapted to form a seat for and supporting the cutter insert B (Fig. 5) with its upper surface flush with and constituting a continuation of the work supporting surface of the table and is formed centrally thereof with an opening 3 through which is adapted to extend the rotary cutter element C, in the present instance, formed with a plurality of circumferentially disposed blades 4.

The table A is vertically adjustable with respect to the saw or cutter element C so as to effect cutting engagement of the blades 4 with the material or work D, carried by and movable over the table A, to produce in said work the desired cut or intaglio design. The structure above described including the insert B, as shown in Fig.

5 and designated the prior art, being of conventional design, a detailed description of the means for raising and lowering the table is deemed unnecessary and hence is not shown on the drawing.

While machines constructed and operated as above described have been more or less efficiently used in the wood working industry, they have been found deficient in cutting or forming cuts or designs intaglio in fiber board, since in connection with the latter it has been found impossible to effect the design without tearing away, ravelling or spalling the edges as illustrated at (a) in Fig. 5 and which deficiency has in many instances been more pronounced by the use of certain types of cutters, the space (b) of necessity having to be of sufficient dimension to accommodate all of the types of cutters normally used, and, therefore, providing no supporting edge directly adjacent to and closely fitting completely around the edges of the cutters. It has been found necessary in working fiber board, to effect smooth unravelled edges of the cuts or intaglio designs, that the edge of the perimeter of the opening in the insert exactly fit the edges of the cutters, so as to form a support for the edges of the cuts or designs being formed in the fiber board.

In order to prevent ravelling or spalling of the edges of the design during the process of forming in materials such as fiber board, a blank insert B, as shown in Fig. 1, is placed in the table A, the cutter blades 4 of the type required to produce the desired design in materials D are mounted on cutter element C which is caused to rotate. The table A is then moved to bring the blank insert B into engagement with the rotating cutter and downwardly until the cutter has passed through and projected above the surface of insert B a distance equal to the depth of the cut 5 to be made in work D, where it remains during the cutting operation. The work D is then directed over the surface of said table in engagement with the rotary cutter during the design forming process. Therefore, it will be apparent that in forming the insert and the design as above described the perimeter or edge 6 of opening 3 exactly conforming to the contour of the cutters will correspond exactly to the contour of and support the edge of the design 5, as shown in Fig. 4, thereby eliminating the space (b) and consequent ravelled edge (a) heretofore prevalent, as shown in Fig. 5.

It will thus be seen that a new insert is produced for each type of work with its opening conforming exactly to the contour of the design, and in accordance with the depth of the design, the insert and design being formed in one continuous operation.

Fig. 7 shows different types of cutters or cutter blades 4a and 4b, and Fig. 6 illustrates another form of insert opening 3a, wherein the type of blade 4a is adapted to cut the design in work D.

The manner of forming an insert for each type of design and the operation of successively effecting the design, with the attendant advantages, would seem to be sufficiently clear from the above description as to warrant further explanation unnecessary.

From the above it will be apparent that I have designed a method and insert, adapted to effect cutting of intaglio designs in fiber board at a minimum expenditure of time, labor, and production cost, and efficient for the purposes intended.

Although in practice I have found that the form of my invention illustrated in the accompanying drawing and referred to in the above description as the preferred embodiment is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A method of producing intaglio designs in fiber board, consisting in placing a blank insert in the table of a rotary cutting machine, moving said table in engagement with said cutter to form an opening in the insert exactly fitting the contour of that portion of the cutter projecting above the surface of the insert a distance equal to the depth of the design to be made, the ends of said opening conforming to the design forming edges of the cutter, and then subjecting the fiber board carried by said table to the cutting action of said cutter to produce in said board the predetermined design.

2. A method of producing a design in fiber board, consisting in placing a blank insert in the table of a machine having a rotary cutter, moving said table in engagement with said cutter to form an opening in the insert, the ends of the perimeter of the opening conforming exactly to the contour of the cutting edge of the cutter, and then subjecting the fiber board carried by said table to the cutting action of said cutter to effect therein the predetermined design, the edges of the design being progressively supported by the perimeter edge of said insert opening during cutting operation, whereby ravelling of the edges of the design is prevented.

3. A method of producing a predetermined design in fiber board and the like, and cutter insert corresponding to said design, consisting in placing a blank insert in the table of a machine having a rotary cutter adapted to effect said predetermined design, moving said table with the insert in engagement with the cutter until the latter has formed an opening in the insert and is projected above the surface thereof a distance equal to the depth of the predetermined design, then directing over the surface of the table and insert the work in engagement with the cutter, whereby portions of the edges of the perimeter of the insert opening are coincident with the edges of the design being formed and which are progressively supported thereby during the design forming operation to effect clean cut unbroken edges of the design.

ALBERT SIDNEY LEWIS.